United States Patent Office 3,405,070
Patented Oct. 8, 1968

3,405,070
PROCESS FOR PREPARATION OF MICROCAPSULES
Zoila Reyes, Menlo Park, Calif., assignor, by mesne assignments, to International Business Machines Corporation, New York, N.Y., a corporation of New York
No Drawing. Filed Jan. 30, 1961, Ser. No. 85,487
10 Claims. (Cl. 252—316)

ABSTRACT OF THE DISCLOSURE

A process for preparing microcapsules by (1) forming an emulsion having a solution containing a gellable lipophobic polymer as the dispersed phase and a continuous phase of lipophilic polymer in a non-polar organic solvent, (2) gelling the lipophobic polymer to form a plurality of gelled polymeric droplets, and (3) precipitating the lipophilic polymer around the dispersed phase, i.e., said gelled polymeric droplets, by adding a nonpolar organic nonsolvent liquid for the lipophilic polymer.

---

My invention relates to microcapsules and more particularly, internally supported microcapsules and the proces for their preparation. Previous microcapsules have been prepared from gellable hydrophilic colloids such as gelatin. These microcapsules can contain only oily non-polar substances, are structurally weak and are subject to degradation by water.

I have invented microcapsules which contain polar solvents, have improved structural stability, and are tolerant of water. Essentially, these microcapsules are lipophilic polymer films surrounding droplets of gelled lipophobic polymers.

These microcapsules are prepared by forming an emulsion having a solution containing a gellable lipophobic polymer as the dispersed phase and a continuous phase of lipophilic polymer in non-polar organic solvent, gelling the lipophobic polymer, and precipitating the lipophilic polymer around the dispersed phase whereby microcapsules are formed, each having a lipophilic polymer film surrounding a droplet of gelled lipophobic polymer. The encapsulated material is then separated from the external phase.

By way of definition, the term "polar solvent" is intended to include any solvent such as water, wherein the molecular structure of the solvent is based on an electrostatic or polar bond, as opposed to a co-valent bond. "Gelled" polymers for purposes of this application are aggregated polymers wherein aggregation is less complete than in flocculation or coagulation and wherein the loose, ramified aggregates encompass the solvent to form coherent systems.

A few generatizations, which may seem obvious to the experienced artisan, will aid in understanding my invention. Thus, the various solutes and solvents should be substantially unreactive with each other, with the gellable polymer, with the encapsulating polymer, with the various cross-linking or complexing catalysts or agents. The external phase should be more viscous than the dispersed phase to obtain good droplet size. Improved quality and yields of microcapsules result from more stable emulsions.

Examples of useful polar solvents include methanol, ethanol, acetone, glycerin, lower molecular weight polyethylene glycols, aminoalcohols, for example, ethanolamine, amides such as formamide and ethanol acetamide. Mixtures of polar solvents can be utilized when necessary.

The non-polar phase can be any non-polar solvent which is substantially immiscible with the polar phase. Examples of such solvents include hexane, octane, toluene, xylene, the Arachlors (halogenated biphenyls), trichlorobenzene, chlorobenzene, perchloroethylene, α-bromo octane, and similar solvents.

The usual cationic, anionic and nonionic emulsifying agents, can be used to advantage in my process. Examples of such emulsifiers include lecithin, glycerol lactopalmitate, morpholine oleate, 2-amino-2-methyl propanol oleate, sodium laurylsulfonate N-methyl taurine stearate, and tris-(hydroxymethyl) aminomethane oleate. Emulsification can be carried out at temperatures to about 70°–80° C., but are preferably carried out at temperatures of about 20°–50° C.

Both natural and synthetic lipophobic polymers can be utilized to form gels in the instant process. Examples of natural polymers include gelatin, casein, zein, locust bean gum, Irish moss, gum arabic, agar-agar, pectins, and starch. Gellable synthetic polymers include such polymers as hydroxyethyl cellulose, ethylhydroxyethyl cellulose, polyvinyl pyrrolidone and silicones.

Polymers which can be utilized in the external (continuous) phase are any polymeric compositions capable of being dissolved in the non-polar solvent forming the continuous phase and having the desired characteristics as encapsulating material. The preferred polymers are those which possess excellent chemical resistance and dimensional stability, which are heat stable, and which retain suitable flexibility and toughness under various temperature conditions. Examples of suitable polymers include those based on cellulose such as ethyl cellulose, nitrocellulose, polystyrene and polystyrene copolymers (lipophilic), vinyl acetate-vinyl chloride copolymers, polyvinyl chloride, polyvinylidene chloride, polyethylene, polypropylene, polybutene, polyisobutylene, and natural and synthetic rubbers, polyvinyl fluoride, polyesters such as styrenated polyesters. Resins such as alkyd resins and blends of these polymers and resins are also useful in my process. Ethyl cellulose is particularly satisfactory because of its high solubility in inexpensive solvents (e.g. chlorinated hydrocarbons such as carbon tetrachloride and methylene chloride, or aromatic hydrocarbons such as benzene, xylene, etc.), its extensive compatibility and its stability to light, heat and chemical action by bases. It should be understood that some polymers will be better than others for specific uses. Thus, it is known that polymethyl methacrylate hydrolyzes in the presence of strong acids whereas polyethylene is substantially immune to such hydrolysis.

In the first step of my process, the gellable polymers and polar solvents are formed into a solution or emulsion which can contain a third agent such as a dye, a dye forming reagent, and an acid or base. Examples of such systems include sodium hydroxide and polyvinyl alcohol in water, alkali and sodium alginate in water, polyvinyl pyrrolidone in water, glycogen in formamide, albumin in water, and ethyl-hydroxyethyl cellulose in water. It is preferred that the gellable polymers be fibrous rather than spheroid.

These solutions or emulsions are emulsified into a solution of a lipophilic polymer in a non-polar solvent. Specifically, such external phase systems include polymethyl methacrylate in benzene, polystyrene in benzene, polyvinyl chloride in chlorobenzene, rubber in benzene, Saran (a polyvinyl chloride-polyvinylidene chloride copolymer) in dioxane, ethyl cellulose in petroleum ether and polyethylene in perchloroethylene. Dyes can also be incorporated into the external phase or grafted onto the external phase polymer to obtain color capsules. Generally, ratios of from about 2–4:1 by weight of the internal phase to encapsulating material is required to obtain the desired encapsulation of droplets having a diameter of from about 2 to about 20 microns.

Gelation of the internal phase can be obtained by cooling or by the addition of gelling agents such as inorganic salts or organic compounds to the emulsion which are more soluble in the internal phase than in the external phase and which do not precipitate the external phase. This addition can be obtained by forming two emulsions, one containing the gellable polymer and the other the gelling agent, from a common external phase solvent and combining the two emulsions with agitation. Alternately, counter-current mixing techniques can be utilized to introduce the gelling agent to the internal phase. Heat and "ageing" can also be used to advantage to form the desired gels. The examples of specific systems include the addition of sodium sulfate to an internal phase utilizing polysaccharides as the gelling agent or the addition of polyethylene maleic anhydride to a water solution of polyvinyl pyrrolidone. Polymers containing multiple carboxyl radicals, such as polyacrylic acid, could also be utilized for this purpose.

Once the gel is formed, the polymer in the external phase is precipitated by addition of a complexing, cross-linking or precipitating agent to the external phase. By way of example, hexane or low molecular weight polymers, such as polybutene and polyisobutylene, can be utilized to precipitate polymethyl methacrylate from solution in benzene or perchloroethylene. Benzene can be utilized to precipitate polyvinyl chloride from solution in chlorobenzene.

The capsules can be formed by adding to the external phase a miscible solvent in which the encapsulating polymer is poorly soluble to precipitate the polymer and then crosslinking or complexing the polymer. Once the capsules are formed, the external phase solvent can be decanted and the capsules lyophilized. Alternately, the polymers precipitated around the dispersed phase droplets can be crosslinked and the capsules spray dried.

Once the microcapsules are precipitated, they can be separated by processes set out in my copending United States patent applications, Ser. No. 11,286, filed Feb. 26, 1960, now U.S. Patent No. 3,173,878, and Ser. No. 11,341, filed Feb. 26, 1960.

The following examples more specifically illustrate my invention. However, it is not intended that my invention be limited to the exact procedures set out. Rather, it is intended that all equivalents obvious to those skilled in the art be included within the scope of my invention as claimed.

Example I

The following solutions were prepared:

Solution A:

| | G. |
|---|---|
| Polyethylene glycol 200 | 1.0 |
| Borax ($Na_2B_4O_7 \cdot 10H_2O$) | 0.5 |
| Urea | 1.5 |
| Water | 12.0 |
| | 15.0 |

Solution B:

| | G. |
|---|---|
| Trisodium phosphate ($Na_3PO_4 \cdot 12H_2O$) | 0.7 |
| Polyvinyl alcohol 52–22 (Du Pont) | 0.25 |
| Polyethylene glycol 400 | 12.80 |
| Water | 21.25 |
| | 35.00 |

Solution A was emulsified in 30 g. of 10% ethyl cellulose in xylene containing 0.35 g. of Thixcin R and the castor oil ester sold by the Baker Castor Oil Co.) and the emulsion was diluted with 40 g. of carbon tetrachloride.

Solution B was emulsified in 70 g. of 10% ethyl cellulose in xylene containing 0.35 g. Thixcin R and the emulsion was diluted with 70 g. of carbon tetrachloride.

The two emulsions were then gradually mixed (emulsion from solution A was added to emulsion from solution B) and stirred at room temperature until the interaction between the aqueous solutions was complete. A uniform emulsion of gelled particles of polyvinyl alcohol (containing the aqueous phase) in ethyl cellulose resulted. After standing overnight at room temperature, the fine particle emulsion was treated with petroleum ether (65°–110° C.) to cause the gradual deposition of the ethyl cellulose on the swollen polyvinyl alcohol gel. Two grams of Multiwax W–445 (a microcrystalline wax from Petroleum Specialties, Inc.) was included in a portion of the petroleum ether used for precipitating the ethyl cellulose. When satisfactory deposition of the ethyl cellulose was achieved, the mixture was cooled to 10° C. and spray-dried coatings were made by spraying the microcapsule suspension on the substrate along with a current of warm air. The coatings obtained gave satisfactory prints on phloroglucinol-diazo coated papers.

Example II

The following solution was prepared:

| | G. |
|---|---|
| 4% sodium silicate in water | 12.5 |
| Phloroglucinol dihydrate | 0.2 |
| Glucose | 0.1 |
| 1% sodium alginate in water | 12.5 |

The above solution was emulsified in 45 g. of 10% ethyl cellulose in xylene containing 0.2 g. of Thixcin R and the emulsion was diluted with 40 g. of xylene, and labeled emulsion A.

Another emulsion was prepared by emulsifying 1 ml. of water containing 0.04 g. of calcium chloride dihydrate in 5 g. of 10% ethyl cellulose in xylene. This emulsion was diluted with 8 g. of xylene and then was gradually added to emulsion A. The mixture was stirred at room temperature and diluted with 100 g. of trichloroethylene. Stirring was continued until all the sodium alginate was gelled by interaction with the calcium chloride solution. The emulsion was then stored overnight in a refrigerator. Then petroleum ether (65°–110° C.) was gradually added with stirring at room temperature to cause the deposition of the ethyl cellulose on the calcium alginate gel. After cooling to about 10° C., the microcapsule suspension was allowed to settle in a refrigerator. The equilibrium liquid was decanted and the microcapsules were washed with petroleum ether (65°–110° C.) and treated with a solution of 2 g. of Multiwax W–445, a microcrystalline wax in petroleum ether (25 ml.) and mineral oil (5 ml.). After stirring for 30 minutes, the suspension was allowed to stand overnight at room temperature. The capsules were then isolated by filtration, washed with low boiling petroleum ether (30°–60° C.) and air dried. Powder-like capsules printed well on diazo sensitized papers.

Polymer structure, as well as constituent elements and chemical composition of the polymer determine its utility as a microencapsulating agent. Thus, the inclusion of small amounts of branched chain polymers in a linear polymer prevents undue distintegration of dispersed phase droplets during spray drying separation procedures. Thus, to get a higher yield of better microcapsules, I add as little as 0.01–0.02% by weight of the encapsulating polymer, of a branched chain polymer, such as branched polystyrene, to an external phase containing linear polyethylene as the encapsulating polymer. Where no multiple polymer systems are being formulated, the addition of small amounts of high molecular weight polymer to the low molecular weight encapsulating polymer normally aids in the formation of better capsules. For example, I prefer to add to a lower molecular weight polyethylene about 0.1% of a high molecular weight polyethylene. While small amounts of higher molecular weight polymers aid in microcapsule formation and structural stability, larger amounts of high molecular weight encapsulating polymers cause the formation of irregular masses of encapsulating polymer around the dispersed phase droplets, rather than regular spheroidal capsules.

Now, having described my invention, I claim:

1. A process for preparing microcapsules, suitable for containing polar liquids, said process comprising:
  forming an emulsion having a solution containing a gellable lipophobic polymer as the dispersed phase in a continuous phase of lipophilic polymer in a non-polar organic solvent immiscible with the solvent of the dispersed phase solution,
  gelling the lipophobic polymer to form a plurality of gelled polymeric droplets, and
  adding a nonpolar organic non-solvent liquid, for the lipophilic polymer, to cause the lipophilic polymer to precipitate around the gelled polymeric droplets to form an outer capsule film around the droplets.

2. The process of claim 1 wherein the lipophilic polymer comprises from about 2:1 to about 4:1, by weight, dispersed phase to encapsulating polymer and wherein microcapsules are formed having a diameter of from about 2 to about 20 microns.

3. A process for making microcapsules comprising:
  dissolving a lipophobic gellable polymer in a polar solvent,
  dissolving a lipophilic polymer in a non-polar solvent,
  emulsifying the polar solvent solution in the non-polar solvent solution to form a polar solvent dispersed phase in a non-polar solvent continuous phase,
  gelling the lipophobic polymer to form a plurality of gelled polymeric droplets, and
  adding a nonpolar organic non-solvent liquid, for the lipophilic polymer, to cause the lipophilic polymer to precipitate around the gelled droplets to form a lipophilic polymeric film around the droplets.

4. A process for making microcapsules comprising:
  dissolving a lipophobic gellable polymer in a polar organic solvent,
  disolving a lipophilic polymer in a non-polar organic solvent,
  emulsifying the polar solvent solution in the non-polar solvent solution to form a polar solvent dispersed phase in a non-polar solvent continuous phase,
  gelling the lipophobic polymer to form a plurality of gelled polymeric droplets,
  adding a nonpolar organic non-solvent liquid, for the lipophilic polymer, to cause the lipophilic polymer to precipitate around the gelled droplets to surround the droplets with a film of lipophilic polymer, and
  separating the encapsulated gelled droplets from the continuous phase solvent.

5. A process for preparing microcapsules, said process comprising:
  forming an emulsion having a solution containing a gellable lipophobic polymer selected from the group consisting of gelatin, casein, zein, locust bean gum, Irish moss, gum arabic, agar-agar, pectin, starch, alginic acid, alginic acid salts, polyvinyl alcohol, hydroxyethyl cellulose, ethyl-hydroxeyethyl cellulose, polyvinyl pyrrolidone, glycogen, silicone, and albumin, as the dispersed phase in a continuous phase of lipophilic polymer selected from the group consisting of ethyl cellulose polymers, nitrocellulose, polystyrene, polystyrene copolymers, vinyl acetate-vinyl chloride copolymers, polyvinylidene chloride, vinyl chloride-vinylidene chloride copolymers, polyethylene, polypropylene, polybutene, polyisobutylene, natural rubber, synthetic rubbers, polyvinyl chloride, polyvinyl fluoride, polyesters and alkyd resins, in a non-polar organic solvent immiscible with the solvent of the dispersed phase solution,
  gelling the lipophobic polymer to form a plurality of gelled polymeric droplets, and
  adding a nonpolar organic non-solvent liquid, for the lipophilic polymer, to cause the lipophilic polymer to precipitate around the gelled droplets to surround the droplets with a lipophilic polymer film.

6. The process of claim 5 wherein the gellable lipophobic polymer is polyvinyl alcohol and the lipophilic polymer is ethyl cellulose.

7. The process of claim 5 wherein the gellable lipophobic polymer is alginic acid salts and the lipophilic polymer is ethyl cellulose.

8. The process of claim 5 wherein the lipophobic polymer is gelatin and the lipophilic polymer is ethyl cellulose.

9. A process for making microcapsules, said process comprising:
  dissolving a lipophobic gellable polymer selected from the group consisting of gelatin, casein, zein, locust bean gum, Irish moss, gum arabic, agar-agar, pectin, starch, alginic acid, alginic acid salts, polyvinyl alchol, hydroxyethyl cellulose, ethylhydroxyethyl cellulose, polyvinyl pyrrolidone, glycogen, silicone, and alubumin in a polar solvent,
  dissolving a lipophilic polymer selected from the group consisting of ethyl cellulose polymers, nitrocellulose, polystyrene, polystyrene copolymers, vinyl acetate-vinyl chloride copolymers, polyvinylidene chloride, vinyl chloride-vinylidene chloride copolymers, polyethylene, polypropylene, polybutene, polyisobutylene, natural rubber, synthetic rubbers, polyvinyl chloride, polyvinyl fluoride, polyesters and alkyd resins, in a non-polar solvent,
  emulsifying the polar solvent solution in the non-polar solvent solution to form a polar solvent dispersed phase in a non-polar solvent continuous phase,
  gelling the lipophobic polymer to form a plurality of gelled polymeric droplets, and
  adding a nonpolar organic non-solvent liquid, for the lipophilic polymer, to cause the lipophilic polymer to precipitate around the gelled droplets to surround the droplets with a lipophilic polymer film.

10. A process for making microcapsules, said process comprising:
  dissolving a lipophobic gellable polymer selected from the group consisting of gelatin, casein, zein, locust bean gum, Irish moss, gum arabic, agar-agar, pectin, starch alginic acid, alginic acid salts, polyvinyl alcohol, hydroxyethyl cellulose, ethyl-hydroxyethyl cellulose, polyvinyl pyrrolidone, glycogen, silicon, and albumin in a polar organic solvent,
  dissolving a lipophilic polymer selected from the group consisting of ethyl cellulose polymers, nitrocellulose, polystyrene, polystyrene copolymers, vinyl acetate-vinyl chloride copolymers, polyvinylidene chloride, vinyl chloride-vinylidene chloride copolymers, polyethylene, polypropylene, polybutene, polyisobutylene, natural rubber, synthetic rubbers, polyvinyl chloride, polyvinyl fluoride, polyesters and alkyd resins, in a non-polar solvent,
  emulsifying the polar solvent solution in the non-polar solvent solution to form a polar solvent dispersed phase in a non-polar solvent continuous phase,
  gelling the lipophobic polymer to form a plurality of gelled polymeric droplets,
  adding a nonpolar organic non-solvent liquid, for the lipophilic polymer, to cause the lipophilic polymer to precipitate around the gelled droplets to surround the droplets with a film of the lipophilic polymer, and
separating the enclosed gelled droplets from the continuous phase solvent.

References Cited

UNITED STATES PATENTS

| | | | |
|---|---|---|---|
| 2,531,536 | 11/1950 | Silver | 167—83 X |
| 2,580,683 | 1/1952 | Kreuger | 167—83 |
| 2,800,458 | 7/1957 | Green | 252—316 |
| 2,327,564 | 8/1943 | Scherer | 167—83 X |
| 2,753,288 | 7/1956 | Visscher | 167—82.5 X |
| 2,789,920 | 4/1957 | Carstensen et al. | 117—100 X |
| 3,043,782 | 7/1962 | Jensen | 252—316 |

OTHER REFERENCES

Dorby et al.: "Phase Separation in Polymer Solution," Journal of Polymer Science, vol 2, No. 1 (1947), pp. 90–100.

LEON D. ROSDOL, *Primary Examiner.*

R. D. LOVERING, *Assistant Examiner.*